United States Patent
Choi

(10) Patent No.: US 8,175,640 B2
(45) Date of Patent: May 8, 2012

(54) MOBILE TERMINAL AND METHOD OF GENERATING CONTENT THEREIN

(75) Inventor: Won Sik Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 583 days.

(21) Appl. No.: 12/395,142

(22) Filed: Feb. 27, 2009

(65) Prior Publication Data

US 2009/0291707 A1 Nov. 26, 2009

(30) Foreign Application Priority Data

May 20, 2008 (KR) ........................ 10-2008-0046669

(51) Int. Cl.
*H04M 1/00* (2006.01)
(52) U.S. Cl. ...................... 455/556.1; 715/731; 386/208
(58) Field of Classification Search ............... 455/556.1; 715/716, 719, 727, 731; 386/201, 208
See application file for complete search history.

(56) References Cited

U.S. PATENT DOCUMENTS

| | | | | |
|---|---|---|---|---|
| 5,956,459 | A * | 9/1999 | Kato et al. | 386/201 |
| 2006/0268121 | A1 * | 11/2006 | Watanabe | 348/231.2 |
| 2007/0136668 | A1 * | 6/2007 | Chen et al. | 715/716 |
| 2010/0110082 | A1 * | 5/2010 | Myrick et al. | 345/473 |

FOREIGN PATENT DOCUMENTS

| | | |
|---|---|---|
| EP | 1 551 182 A1 | 7/2005 |
| EP | 1 819 141 A1 | 8/2007 |
| EP | 1 906 405 A2 | 4/2008 |
| WO | WO-2005/096621 A2 | 10/2005 |

OTHER PUBLICATIONS

Jokela, T., "Authoring Tools for Mobile Multimedia Content", Multimedia and Expo, 2003 Proceedings, International Conference, Jul. 6-9, 2003, Piscataway, NJ, IEEE, vol. 2, pp. 637-640, XP010650635, ISBN: 978-0-7803-7965-7.

* cited by examiner

*Primary Examiner* — Don Le
(74) *Attorney, Agent, or Firm* — Birch, Stewart, Kolasch & Birch, LLP

(57) ABSTRACT

A mobile terminal and method of generating a content therein are disclosed, by which a video file can be created using an image captured by a camera and playback music. The present invention includes a camera for capturing a picture, an audio output module outputting a played music, a display unit displaying the captured picture, a controller controlling the camera to capture a plurality of pictures in the course of playing the music, the controller creating a video file by inserting a plurality of the captured pictures in a specific playtime of the music matching a capture timing point of the picture, and a memory storing the created video file.

28 Claims, 15 Drawing Sheets

MOBILE TERMINAL AND METHOD OF GENERATING CONTENT THEREIN

CROSS REFERENCE TO RELATED APPLICATIONS

This application claims the benefit of the Korean Patent Application No. 10-2008-0046669, filed on May 20, 2008, which is hereby incorporated by reference as if fully set forth herein.

BACKGROUND OF THE INVENTION

1. Field of the Invention

The present invention relates to a mobile terminal and method of generating a content therein, and more particularly, to a mobile terminal and method of creating a video file therein. Although the present invention is suitable for a wide scope of applications, it is particularly suitable for creating a video file using an image captured by a camera and playback music.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, many efforts are ongoing to research and develop a mobile terminal capable of playing back or creating various contents.

SUMMARY OF THE INVENTION

Accordingly, the present invention is directed to a mobile terminal and method of generating a content therein that substantially obviate one or more problems due to limitations and disadvantages of the related art.

An object of the present invention is to provide a mobile terminal and method of generating a content therein, by which a video file can be created using an image captured by a camera and playback music.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a camera for capturing a picture, an audio output module outputting a played music, a display unit displaying the captured picture, a controller controlling the camera to capture a plurality of pictures in the course of playing the music, the controller creating a video file by combining a plurality of the captured pictures with the music such that a specific playtime of the music matches a capture timing point of the picture, and a memory storing the created video file.

In another aspect of the present invention, a method of generating a content in a mobile terminal includes playing a music, capturing a plurality of pictures in the course of the music playback, and combining each of a plurality of the captured pictures with the music such that a specific playtime of the music matches a capture timing point of each of the pictures.

Preferably, the method further includes the steps of creating a video file and playing the created video file, wherein the video file is displayed in a manner that a first picture and a second picture are sequentially displayed and wherein a specific still picture is displayed with a prescribed time interval in a section between the first picture and the second picture.

More preferably, the video file creating step includes the steps of receiving a key signal for creating the video file and transcoding a video signal of a plurality of the captured pictures and an audio signal of the played music.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings illustrate embodiment(s) of the invention and, together with the description, serve to explain the principle of the invention in the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
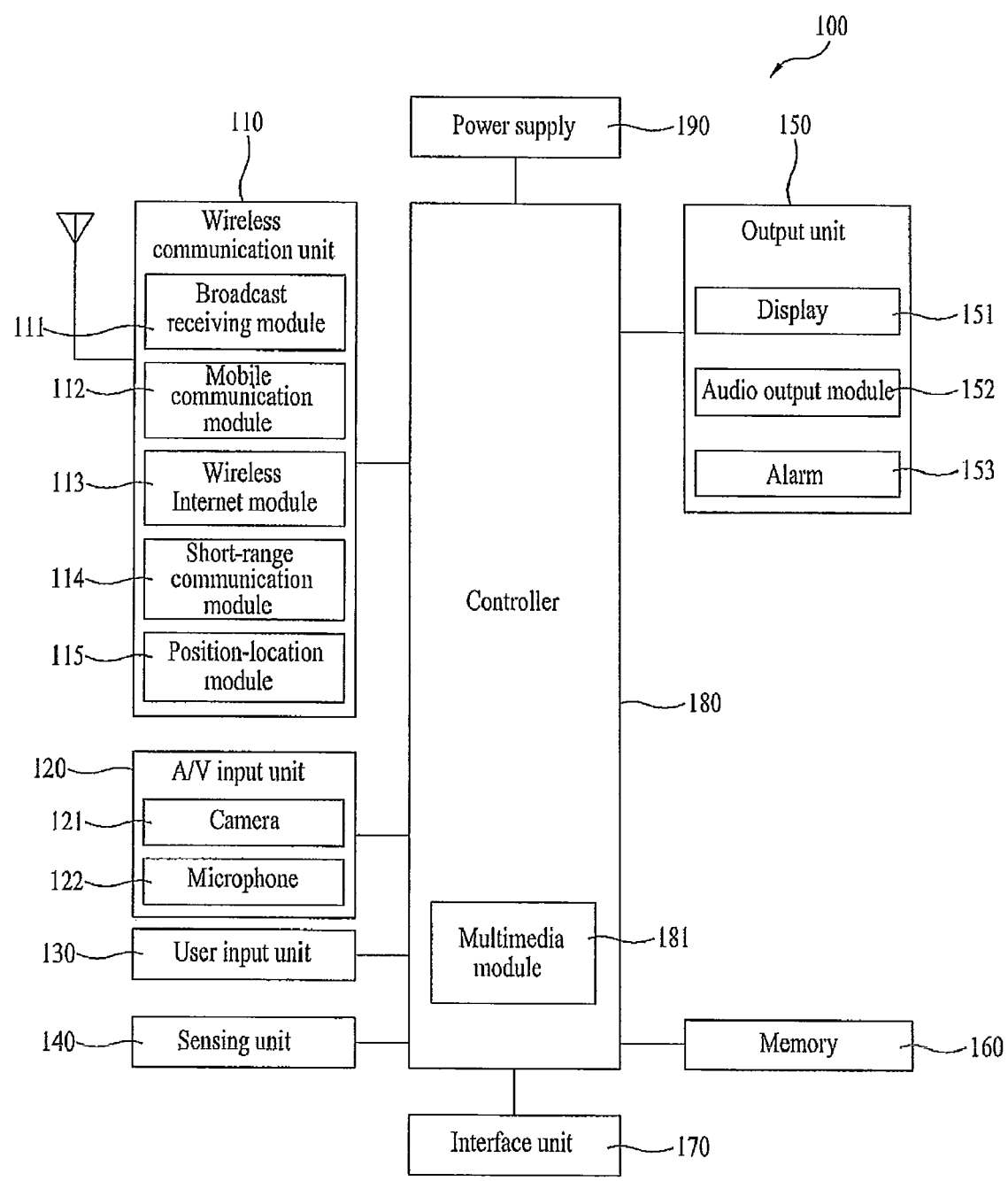
FIG. 1 illustrates a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

Touchscreen can be configured to detect a touch input pressure as well as a touched area. And, the touchscreen can be configured to detect a proximity-touch as well as the touch (real-touch).

In this disclosure, 'touch (real-touch)' means a case that a pointer is actually touched to a screen. And, 'proximity-touch' means a case that a pointer is not actually touched to a screen but approaches a screen in proximity to be spaced apart from the screen in a prescribed distance. In this disclosure, a pointer means a tool for real-touching or proximity-touching a specific part of a displayed image. For instance, a pointer includes one of a stylus pen, a finger and the like.

In order to detect a real-touch or a proximity-touch to the touchscreen, various sensors (not shown in the drawings) can be provided within or in the vicinity of the touchscreen. Alternatively, various sensors for detecting a real-touch or a proximity-touch to the touchscreen can be provided within the sensing unit 140.

As an example of a sensor for detecting a real-touch to the touchscreen, there is a haptic sensor.

Haptic sensor means a sensor capable of detecting a human-sensible or higher touch of a specific object. The haptic sensor is capable of detecting various kinds of information such as roughness of a touch surface, hardness of a touch object, temperature of a touch point and the like.

Sensor for detecting a touch to a touchscreen is capable of detecting a touch-drag. In this case, 'touch-drag' means a case that a touched point is shifted while a touch is maintained. In order to be discriminated from the touch-drag, an action of tapping a prescribed point of a display screen via pointer can be named 'tap-touch'. In this case, a sensor for detecting a touch (e.g., haptic sensor) is capable of detecting a drag direction, speed and length of a touch-drag and the like.

As an example of a sensor for detecting a touch to the touchscreen, there is a proximity sensor.

Proximity sensor means a sensor capable of detecting a presence or non-presence of an object approaching a prescribed detection surface or an object existing in proximity without mechanical contact using an electromagnetic force, an infrared ray or the like. Hence, the proximity sensor has relatively long durability and considerably high utilization.

For example, the proximity sensor can include one of a transmissive photoelectric sensor, a direct reflective type photoelectric sensor, a mirror-reflective photoelectric sensor, an RF oscillation proximity sensor, an electrostatic proximity sensor, a magnetic proximity sensor, an IR proximity sensor and the like.

Operational principles of the RF oscillation proximity sensor among the above proximity sensors are described in the following description for example.

First of all, while an oscillation circuit oscillates a full-wave radio frequency, if an object approaches a sensor detecting surface, the oscillation amplitude of the oscillation circuit is attenuated or stops. This change is converted to an electric signal to detect a presence or non-presence of the object. Therefore, if any material except metallic substance approaches between an RF oscillation proximity sensor and an object, a proximity switch is able to detect a specific object without inference with the material.

Although the proximity sensor is not provided, if the touchscreen is electrostatic, it is able to configure that the proximity of a pointer can be detected with a change of an electric field according to the proximity of the pointer. Therefore, although the pointer is not actually touched to the touchscreen, if the pointer is placed in close proximity, it is able to detect a position of the pointer and a distance between the pointer and the touchscreen.

Moreover, 'position of a proximity-touch by a pointer on a touchscreen' means a position of the pointer vertically opposing the touchscreen in proximity-touch. In case that a proximity distance of a pointer lies within a prescribed distance range, a proximity sensor is cable of recognizing it as a proximity-touch. A proximity distance means a distance between a screen and a pointer. In particular, the proximity distance may mean a shortest distance between a screen and a pointer.

In this disclosure, 'a prescribed point of a screen is proximity-touched' means that a pointer is located at a position in a space vertically opposing the prescribed point to be recognized as a proximity-touch.

Using the proximity sensor, a proximity-touch and a proximity pattern (e.g., proximity distance, proximity-touch direction, proximity speed, proximity-touch time, proximity-touch position, proximity-touch shift state, etc.) are detected. And, information corresponding to the detected proximity-touch action and the detected proximity-touch pattern can be outputted to a touchscreen.

In this disclosure, a proximity speed means a speed of a pointer approaching a screen in proximity or a speed of a pointer getting away from a screen. For instance, a proximity sensor is able to detect a drag direction, a drag speed, a drag length of a proximity-drag and the like. In this case, 'proximity-drag' means a case that a proximity-touched point is shifted while a proximity-touch is maintained. Namely, the term 'proximity-drag' corresponds to a situation where a proximity-touch is dragged while a proximity is maintained.

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
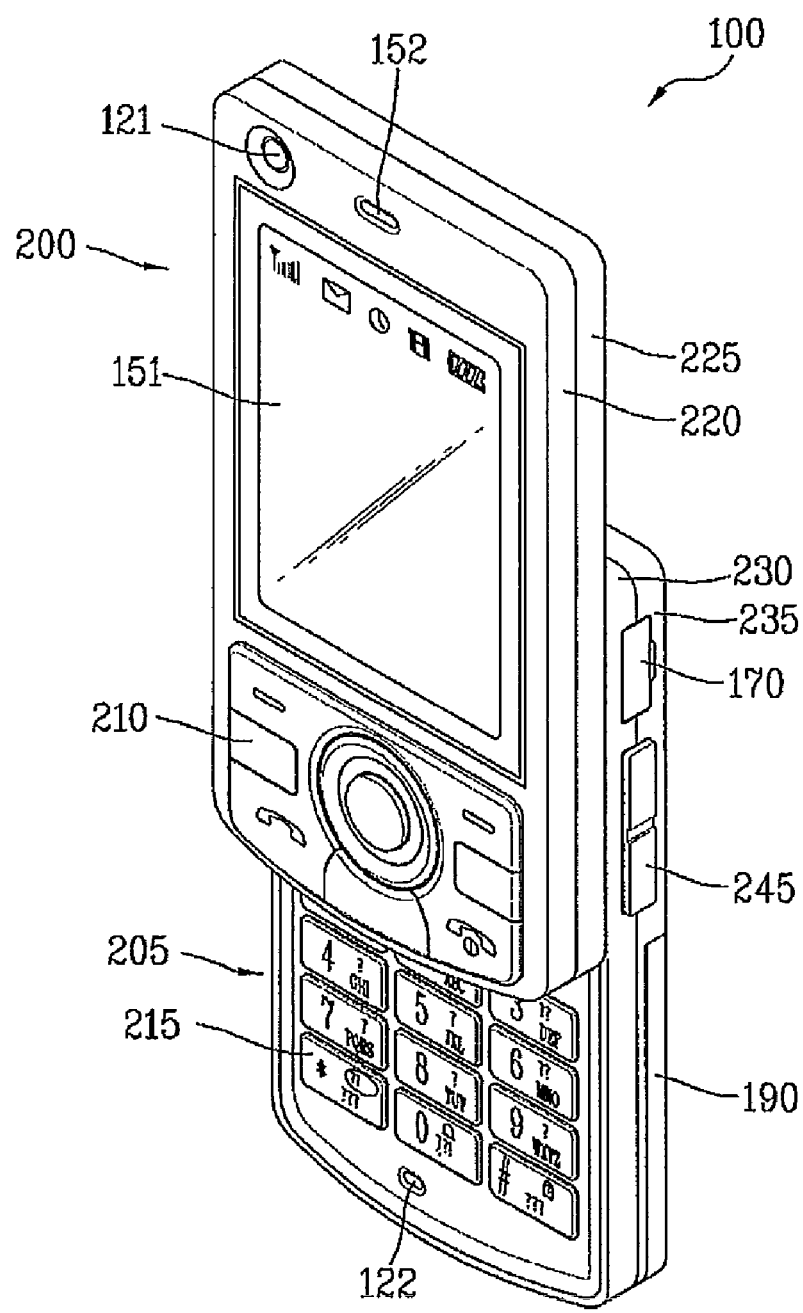
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
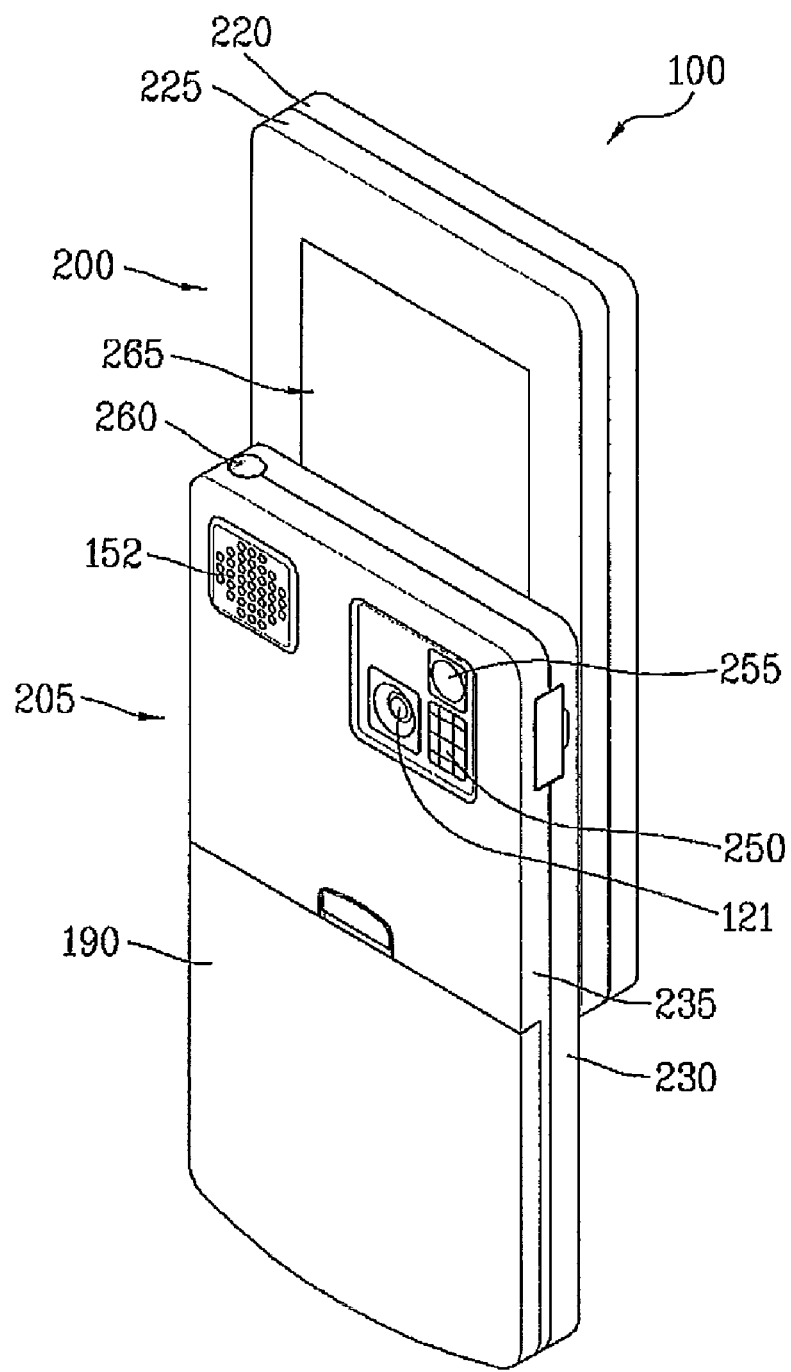
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
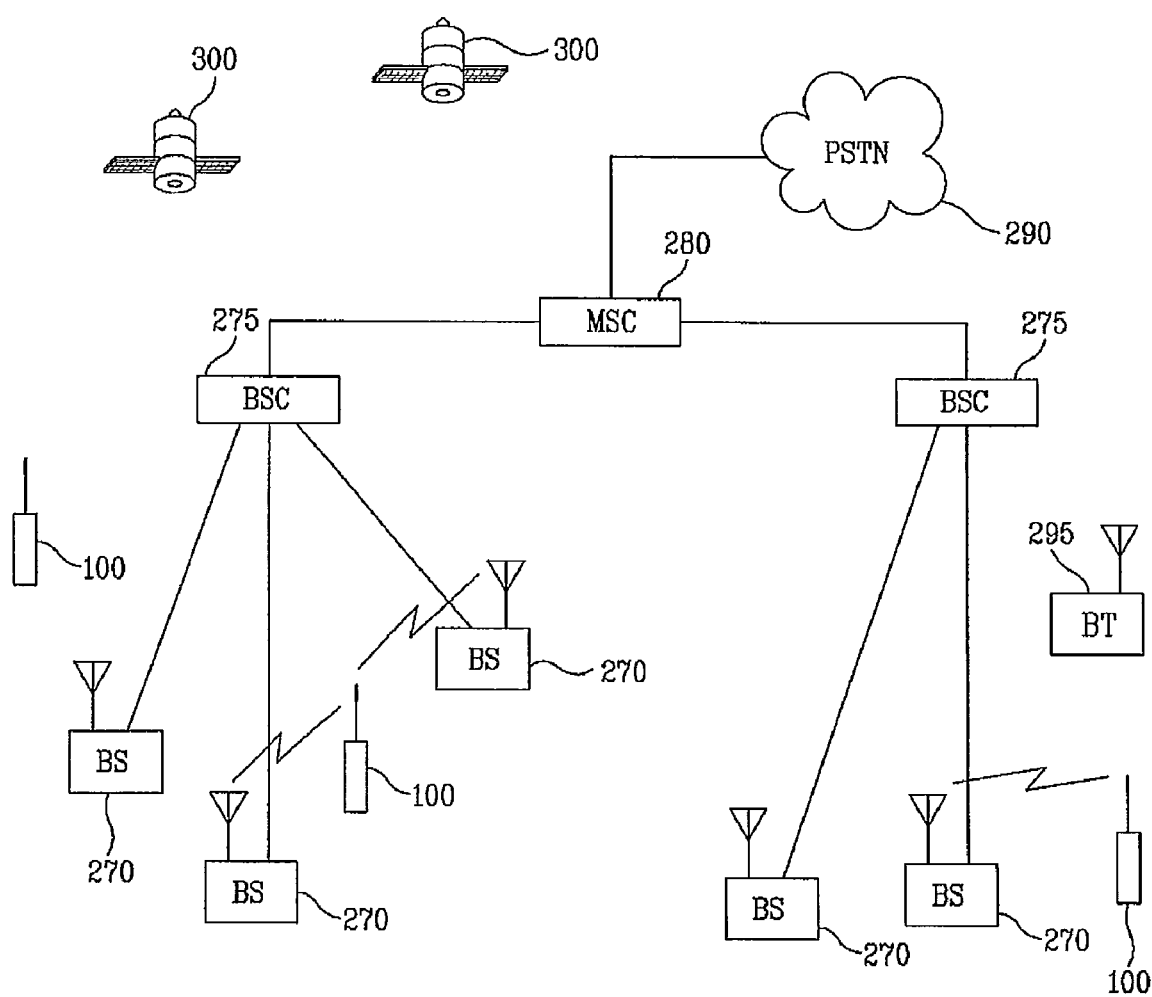
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

A method of generating a content in a mobile terminal according to one embodiment of the present invention is explained as follows. The following methods are described relative to the device shown in FIG. 3. However, one skilled in the art would know that the methods described below may operate with a differently configured device, such as a device configured as a flip-phone, a phone that rotates around a swivel point, or another phone configuration.

Figure 5:
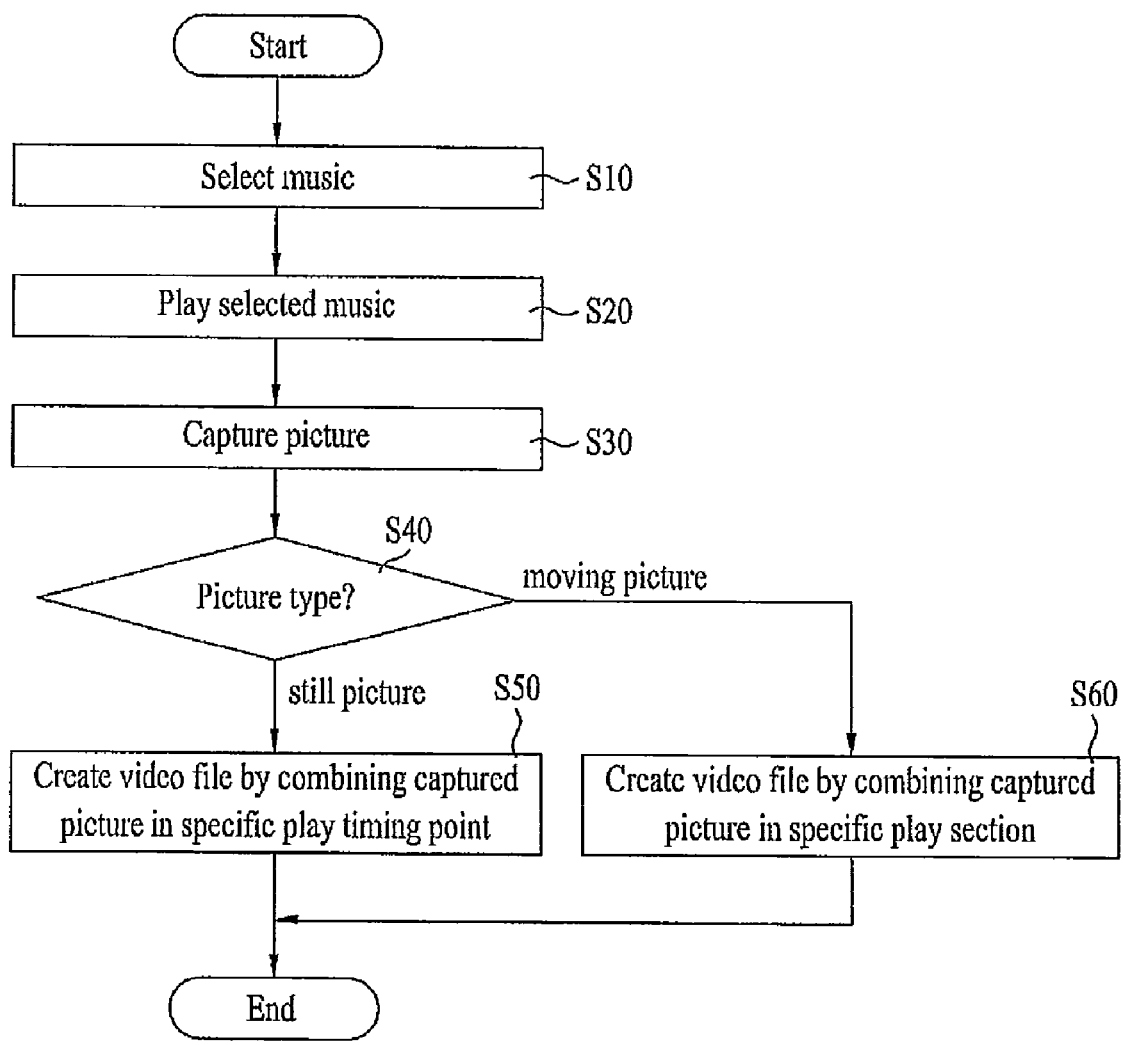
FIG. 5 is a flowchart for a method of generating a content in a mobile terminal according to one embodiment of the present invention.

FIG. 5 is a flowchart for a method of generating a content in a mobile terminal according to one embodiment of the present invention.

Referring to FIG. 5, the mobile terminal 100 according to one embodiment of the present invention is able to create a music video file using an image captured by the camera 121 and playback music.

As noted above, data generated by the A/V input unit 120 may be stored in memory 160, utilized by output unit 150, or transmitted via one or more modules of communication unit 110. This data may include one or more music files, image files, movie files, word processing/spreadsheet files, or other user generated or accessible files. When creating a music video file, one or more of the music files stored in the memory 160 can be used [S10].

The selection of a music file can be performed in one of various modes. For instance, a specific music file can be selected while searching music files or can be selected while in a camera preview mode. A camera preview mode corresponds to a preview state where a preview image is displayed for image capturing. A preview state is a state where a subject for photography is displayed for image image capture. Other preview modes are also possible. Moreover, one or more music files can be selected during music video file creation.

The selected music can be played back [S20]. The playback of the selected music can be performed in the course of searching music files or in a camera preview mode. The played music is outputted via the music (audio) output module 152. While FIG. 5 shows step S20 immediately following step S10, it is also possible for step S20 to be bypassed.

A specific image may be captured via the camera 121 while the selected music is being played [S30]. The captured image can include a still picture or a moving picture. A single image or a plurality of images may be made available for the music video file creation. In a preferred embodiment, a plurality of images captured in a camera mode are made available for the music video file creation.

The controller 180 stores and displays a specific identification mark each time an image capturing event is completed during music playback. The specific identification mark identifies the captured image as being either a still picture or a moving picture. Additionally, the controller 180 displays the image on a prescribed region of a screen as a thumbnail each time the image capturing is completed. The prescribed region may be predefined by the manufacturer and/or may be user defined and/or may be defined by the device pseudo-randomly or in accordance with a corresponding display algorithm.

When the captured image is a still picture, the controller 180 creates a music video file by combining an image with the music such that a specific play timing point of music matches a timing point of capturing the still picture [S40, S50].

Meanwhile, the controller 180 creates the music video file by inserting the captured still image while the music is played back. Alternatively, after the music playback and the image capturing have been completed, the controller 180 creates a music video file using the playback music and the captured still picture according to predetermined sequence of key inputs. The key inputs may be entered via a stylus or finger touch to a touch screen and/or via electro-mechanical buttons.

When the captured image is a moving picture, the controller 180 creates a music video file by combining a captured moving picture with the music such that a specific playback section of the music matches a defined section of the moving picture [S40, S60]. The defined section may be user defined or predetermined (e.g., at the beginning or end of the moving picture.

The controller 180 creates the music video file by combining the captured moving image with the music while the music is played back. Alternatively, the controller 180 creates a music video file using the playback music and the captured moving picture after the music playback and the image capturing have been completed according to a predetermined sequence of key inputs. The key inputs may be entered via a stylus or finger touch to a touch screen and/or via electro-mechanical buttons.

The mobile terminal 100 according to one embodiment of the present invention is able to use both of the still picture and the moving picture for the music video creation.

FIG. 5 shows a sequence where the video files are created in steps S50 or S60 from images captured in step S30. The image capture in step S30 may be performed directly before steps S50 or S60. Alternatively, steps S50 or S60 may be performed at a later time, with the image files used in steps S50 or S60 drawn from files stored in memory.

Figure 6:
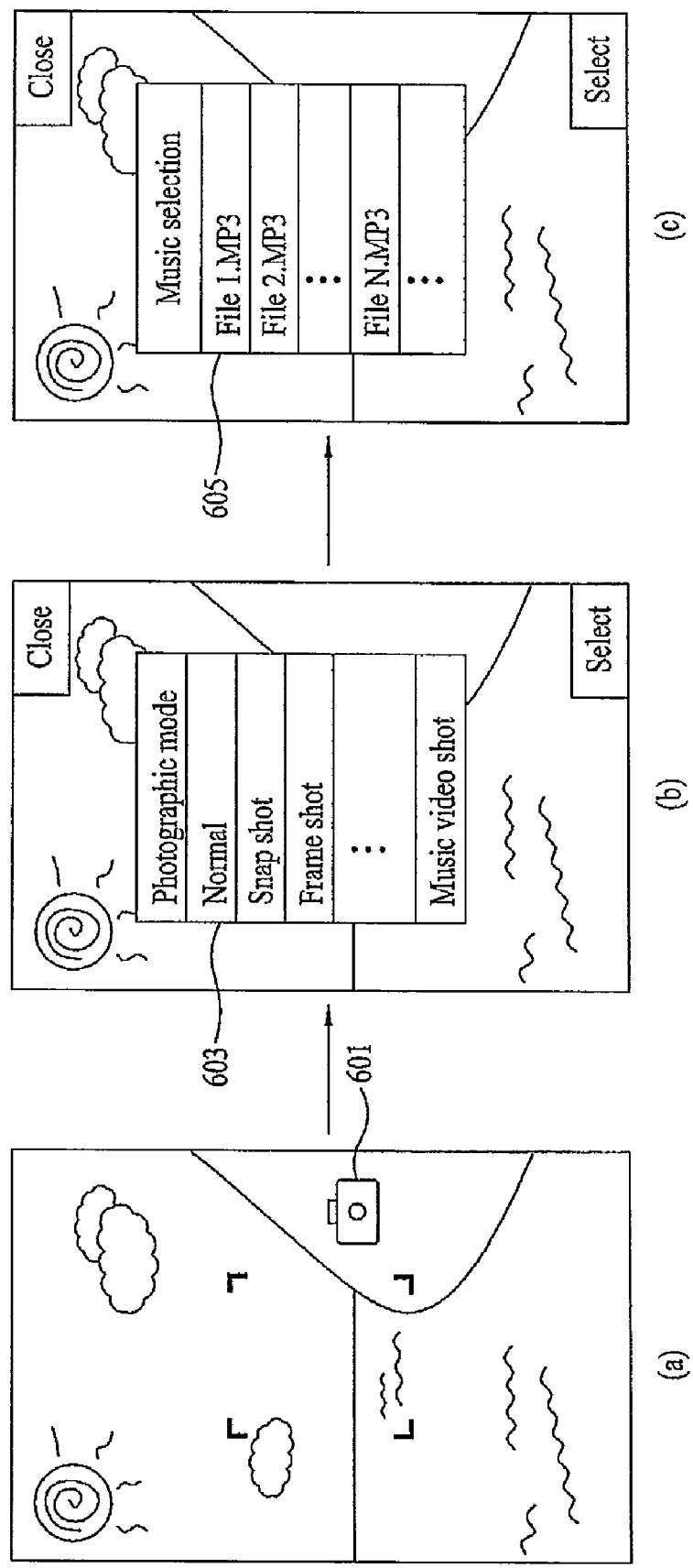
FIGS. 6 to 15 are state diagrams for a method of generating a content in the mobile terminal shown in FIG. 5.

FIG. 6 is a state diagram for a method of selecting a specific music in a camera preview mode for music video creation.

FIG. 6(*a*) shows a state where an image of a subject is displayed on a preview screen for image capturing. An icon for guiding an image capture focus area is displayed on the preview screen as a corner points of a square. The focus area may also be a rectangle, circle or other regular or irregular geometric shape. An icon 601 corresponding to a still picture capturing mode can be displayed on a prescribed region of the screen. Other icons may also be used. Moreover, the controller 180 is able to perform a zoom function of the screen in the preview state.

FIG. 6(*b*) shows a popup window 603 for selecting a capturing mode is displayed. Popup window 603 includes a selectable capturing mode in case of a still picture capturing. A user is able to select 'music video shooting' from the popup window 603. If the 'music video shooting' is selected, the controller 180 displays a popup window 605 for selecting a music to be used for the music video shooting [FIG. 6(*c*)].

In an embodiment where a display screen includes a touchscreen, a specific capturing mode selection on the popup windows 603 and 605 can be manipulated by an actual touch to the screen (via a finger or stylus) or a proximity-touch.

In this embodiment, a user is able to select one or more music files to play. When a plurality of music files are selected, the controller 180 sequentially plays back the plurality of the selected music files. The sequence may be user-defined, or may be defined in accordance with an algorithm (e.g., alphabetical order by artist, alphabetical order by title, and/or ordered by type (jazz, rock, etc.).

In one embodiment, the sequence of files shown in window 605 may be reordered by the user. For example, the user may drag file 3 up in front or file 1 or file 2. Also, the user may select a box (not shown) to indicate that a music file should be skipped and/or looped for continuous play.

Figure 7:
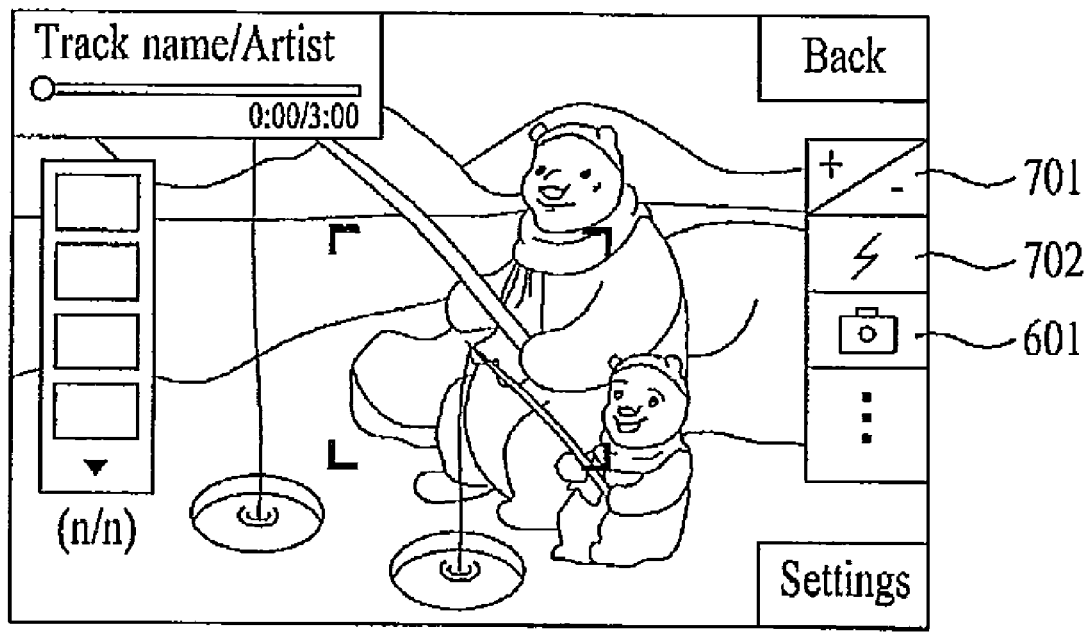

FIG. 7 illustrates a preview state of a music video shooting mode according to one embodiment of the present invention.

As shown in FIG. 7, a title and/or artist of music to be played may be displayed on the screen (e.g., on the right side of a screen). In addition or alternatively, an album name or play list name may be displayed. A total play time and a current play time of the music may also be displayed. As with FIG. 6A, an icon for guiding an image capture focus area may be displayed on the screen. And, a menu executable in the course of music video shooting may be displayed as an icon on a right part of the screen. For instance, an image brightness adjustment icon 701, a flash selection icon 702, a still image capture icon 601 may be displayed. Icons 701-703 are examples of icons that may be displayed. Other icons may be display in addition or in the alternative. The sequence of icons may be user selectable or preset. When one of the displayed icons is selected, a menu corresponding to the selected icon is displayed and/or a corresponding function is executed. The menu of icons may be toggled on and off by the user.

When the screen includes a touchscreen, the icon selection can be performed by an actual touch to the screen (via a finger or stylus) a proximity-touch. For instance, if the icon 601 for capturing a still picture is selected, a still picture of a subject for photography is captured. In particular, if the icon 601 is touched or proximity-touched, the controller 180 captures a still picture of a subject which is being displayed on a preview screen.

One or more thumbnails may be displayed on the screen (e.g., the left side of the screen). In one embodiment, a sequence of still images may be captured and/or stored. In this situation, the controller 180 is able to determine the number of currently captured still pictures and populate the thumbnail section accordingly. Also, the controller 180 is able to display the number of the stored images relative to the total number of images in the sequence or in the memory or a total number of pictures that possibly could be stored (e.g., the displayed "n/n"). The display n/n may indicate that a highlighted thumbnail corresponds to the $3^{rd}$ of a sequence of 5 images, or that the a highlighted thumbnail corresponds to the $3^{rd}$ of a total of 234 stored images. The display n/n may also indicate that a highlighted thumbnail corresponds to the $3^{rd}$ of a sequence of 500 possible stored images. If there is no captured picture in memory, no picture is displayed on the thumbnail region. The thumbnail region may be toggled on and off by the user.

Figure 8:
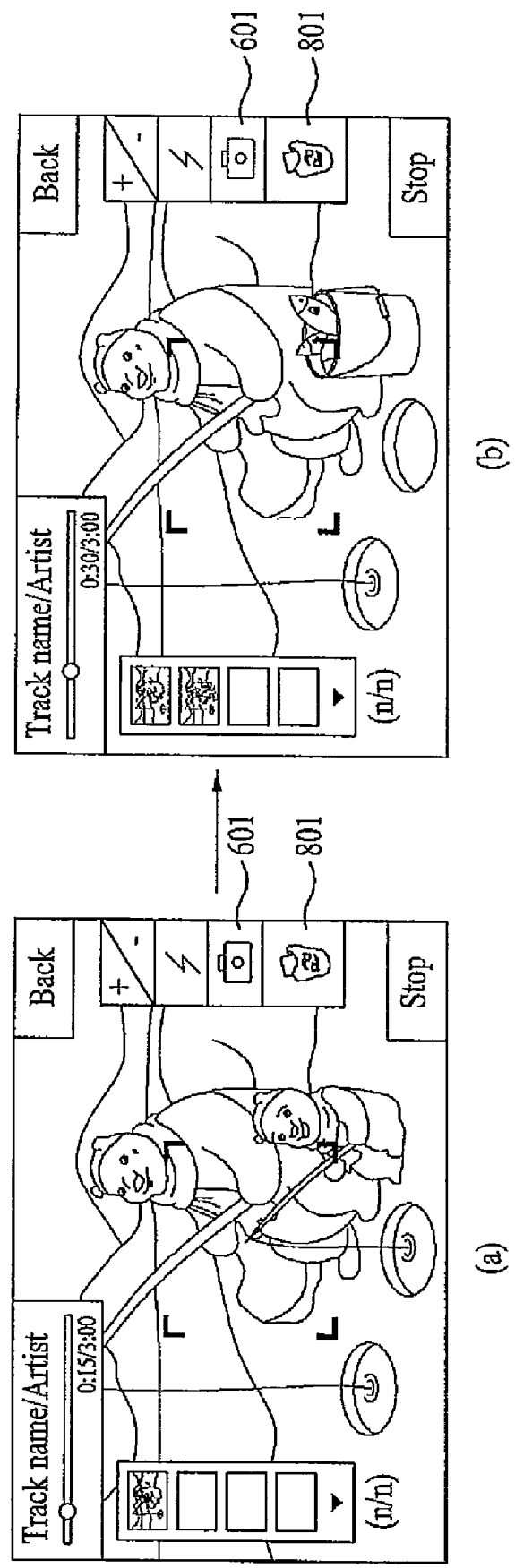

FIG. 8 is a state diagram for capturing a still picture in a music video shooting mode according to one embodiment of the invention.

FIG. 8(a) shows a case where a first still picture is captured in the course of music playback. A captured picture is displayed as a thumbnail on a left part of a screen. In one embodiment, an icon 801 for erasing the captured still picture may be displayed on a right part of the screen. After the first still picture has been captured, a user is able to capture another still picture. For instance, if an icon for capturing a still picture is selected or if a signal for capturing a picture is inputted, the controller 180 is able to capture a second still picture.

FIG. 8(b) shows a case where a second still picture is captured after the first still picture was captured. The first and second captured pictures are displayed as thumbnails on the left part of the screen.

By the above-described method, a user is able to capture a plurality of pictures to be used for creating a music video. A total number of pictures, which can be captured for a music video may be factory set and/or may be set by a user.

Music played in the music video shooting mode may be temporarily stopped by the user. This feature enables a user to change location while capturing still pictures. This features also enables a user to precisely match a specific still picture to a specific timing point of the played music.

With the preceding methods, a user is able to create a music video file using the music played in the music video shooting mode and one or more captured still pictures. In the preceding methods, the captured still picture can be inserted at the time of image capture at a specific play timing point of the music. The captured still picture can also be inserted after the time of image capture at a specific play timing point of the music FIG. 9 is a diagram for the relation between a timing point of capturing a picture and a timing point of playing music corresponding to the situation where a captured still picture is inserted at the time of image capture at a specific play timing point of the music.

Figure 9:
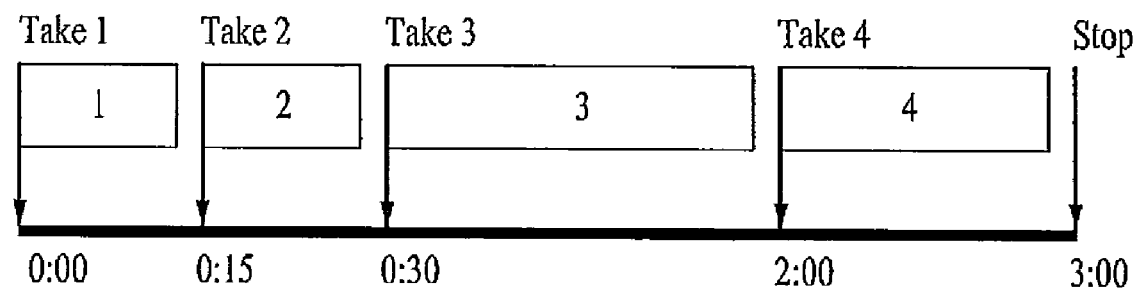

Referring to FIG. 9, a first still picture can be captured at or near a time when the music starts to be played (e.g., at time 0:00). A second still picture is captured at a music playtime of 0:15 seconds, a third still picture is captured at a music playtime of 0:30 seconds, and a fourth still picture is captured at a music playtime of 2:00 minutes. In this example, the controller 180 creates a music video file by combining the captured picture with the music such that the playtime of the music matches the timing point of capturing the corresponding picture.

When the music video file created by the above method is played back, the picture captured at the music play timing point (e.g., the same timing point of the 0:00 play start, 0:15-second point, 0:30-second point, the 2:00-minute point, etc.) matching the timing point of capturing the corresponding picture is displayed. As can be seen in FIG. 9, the duration of the displayed still image persists until a subsequent image is taken.

The mobile terminal 100 according to one embodiment of the present invention is also able to create or modify a music video file by a preprocessing method and/or a post-processing method.

The 'preprocessing method' is a method of creating a music video file during music playback.

In the preprocessing method, a music video can be generated by inserting an image captured while music is being played back (i.e., in real time relative to music playback). The controller 180 is able to insert a specific still or moving picture between a capture timing point of a first still picture and a capture timing point of a second still picture.

Thus, the 'preprocessing method' can be the method of performing both encoding for music video file creation and decoding for selected music play simultaneously.

'Post-processing method' is a method of generating a music video after completion of music playback.

In the post-processing method, a music video can be generated by inserting an image captured after music play back is completed (i.e., not in real time relative to music playback). "Completion of the music playback" can include a case where the music playback has reached a specific timing point within the music file and set by a user, as well as a case where music playback is completed due to the expiration of total music playtime. In the post-processing method, a still picture captured is temporarily stored. And, controller 180 is able to create a music video file by inserting the stored still picture into a user selected point within the music file. This insertion may include transcoding of a video signal of the stored still picture and an audio signal of a playback music file.

'Transcoding' is a scheme for processing, selecting and transforming specific data, which is coded suitable for a first environment, to be compatible to a second environment.

In Internet environment, various networks including x digital subscriber line (xDSL), cable, mobile, public wireless LAN service (WLAN), power line communication and the like coexist, and there are various types of user terminals including high-end personal computer (PC), personal portable information terminal (PDA), mobile phone and the like. In the Internet environment, different multimedia compression schemes including MPEG1, MPEG2, MPEG4, H.264 and the like coexist as well.

If contents are developed by considering all the above factors, massive contents types should be produced. A basic solution for this problem is the transcoding that implements the concept of 'one source multi use' in a manner of providing a function of converting a single content to be usable in common to different networks, resolutions, processor performances, user interfaces.

For instance, if a temporarily stored still picture is compressed by a first algorithm (e.g., compression to JPEG file) and if a playback music file is compressed by a second algorithm (e.g., compression to MP3 file), a video signal of the still picture and an audio signal of the music file can be compressed by a third algorithm (e.g., compression by MPEG4 compression algorithm) for the music video file creation.

Figure 10:
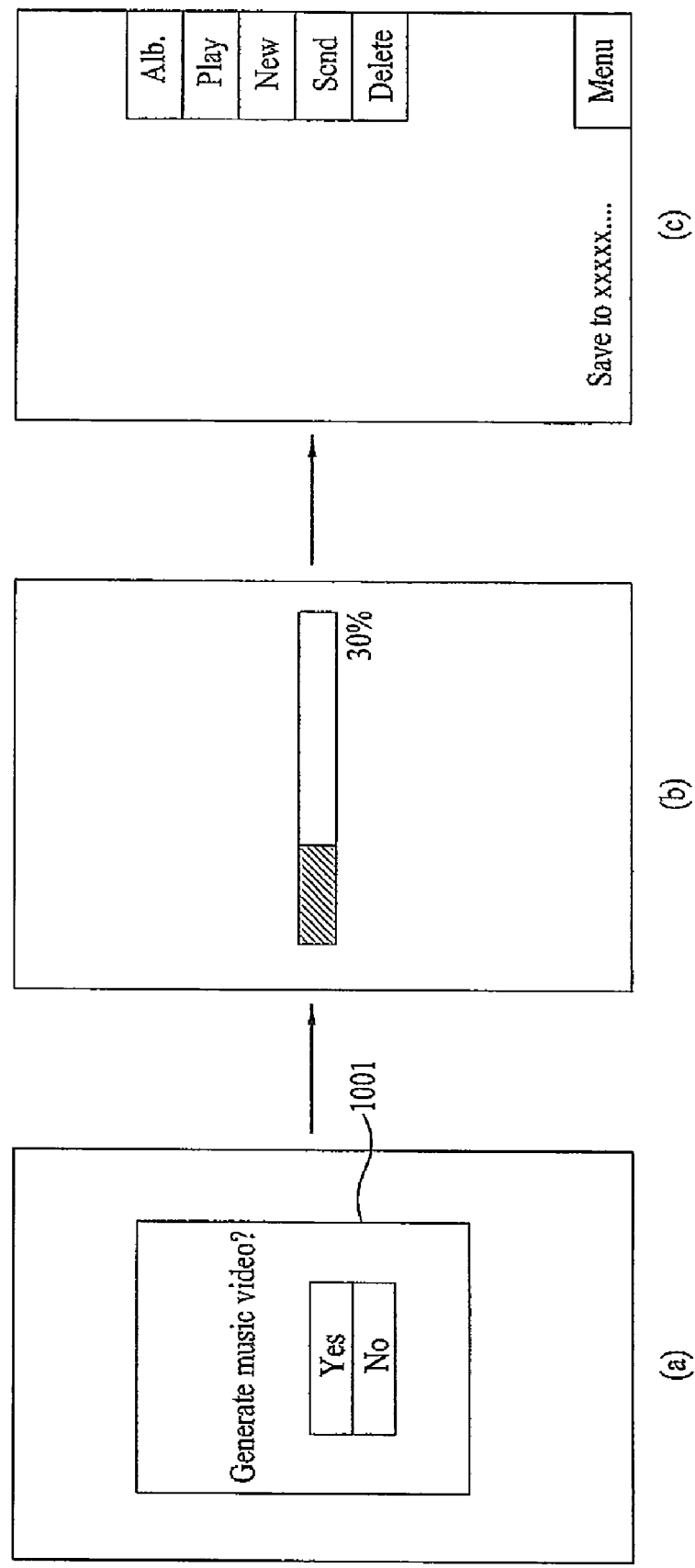

FIG. 10 is an exemplary diagram of a display screen in case that a music video is generated by a post-processing method.

Referring to FIG. 10, if a music playback is completed, the controller 180 is able to display a popup window 1001 for music video generation [FIG. 10(a)].

If 'yes' is selected from the popup window 1001, the controller is able to display a process for creating a music video file [FIG. 10(b)]. If the music video generation is completed, the music video file can be stored in a specific storage area by a user's setup or a default setting.

In FIG. 10(c), shown is an example of a screen on which an image of music video file creation is displayed. A user selects 'A1b.' to search an album storing music video files therein. A user selects 'Play' to play back a generated music video. A user selects 'New' to enter a menu for new music video generation. A user selects 'Send' to transmit a stored music video file to a specific correspondent user. And, a user selects 'Delete' to delete a created music video file. Instead or in addition to searching for an album, it may be possible to search by artist, title or other music meta-data.

Figure 11:
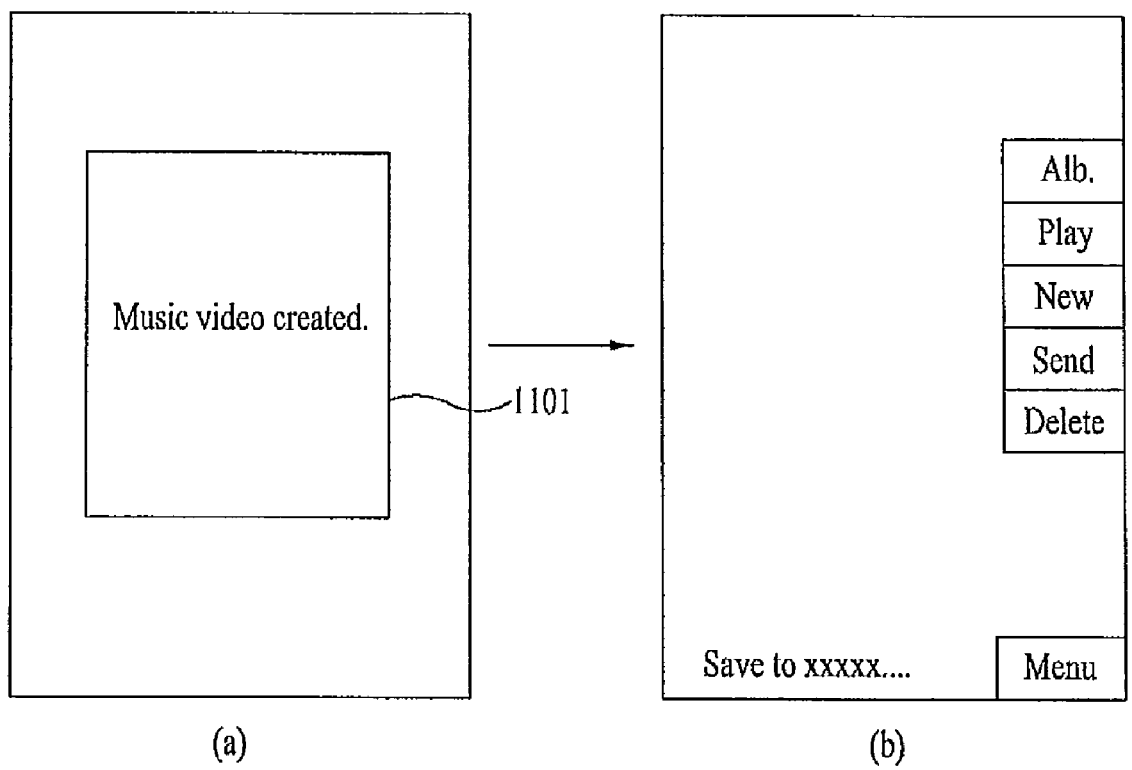

FIG. 11 is an exemplary diagram of a screen on which a case of generating a music video by a preprocessing method is displayed.

Referring to FIG. 11, if music playback is completed, the controller 180 is able to display a popup window 1101 indicating that a music video file has been created [FIG. 11(a)]. In this case, the music video file can be stored in a specific storage area by a user's setup or a default setting.

FIG. 11(b) shows an example of a screen on which an image of music video file creation is displayed. Executable menus are displayed on a right part of the screen. A user selects 'A1b.' to search an album storing music video files therein. A user selects 'Play' to play back a generated music video. A user selects 'New' to enter a menu for new music video generation. A user selects 'Send' to transmit a stored music video file to a specific correspondent user. And, a user selects 'Delete' to delete a created music video file.

As mentioned in the foregoing description, a music video file, which is created using captured still pictures and playback music, is displayed in a manner that a plurality of the captured still pictures are displayed in a slide format. In this case, the first still picture can be displayed with a prescribed time interval between a capture timing point of the first still picture and a capture timing point of the second still picture.

Meanwhile, the mobile terminal 100 according to one embodiment of the present invention can generate a music video including a moving picture captured in the course of music playback.

Figure 12:
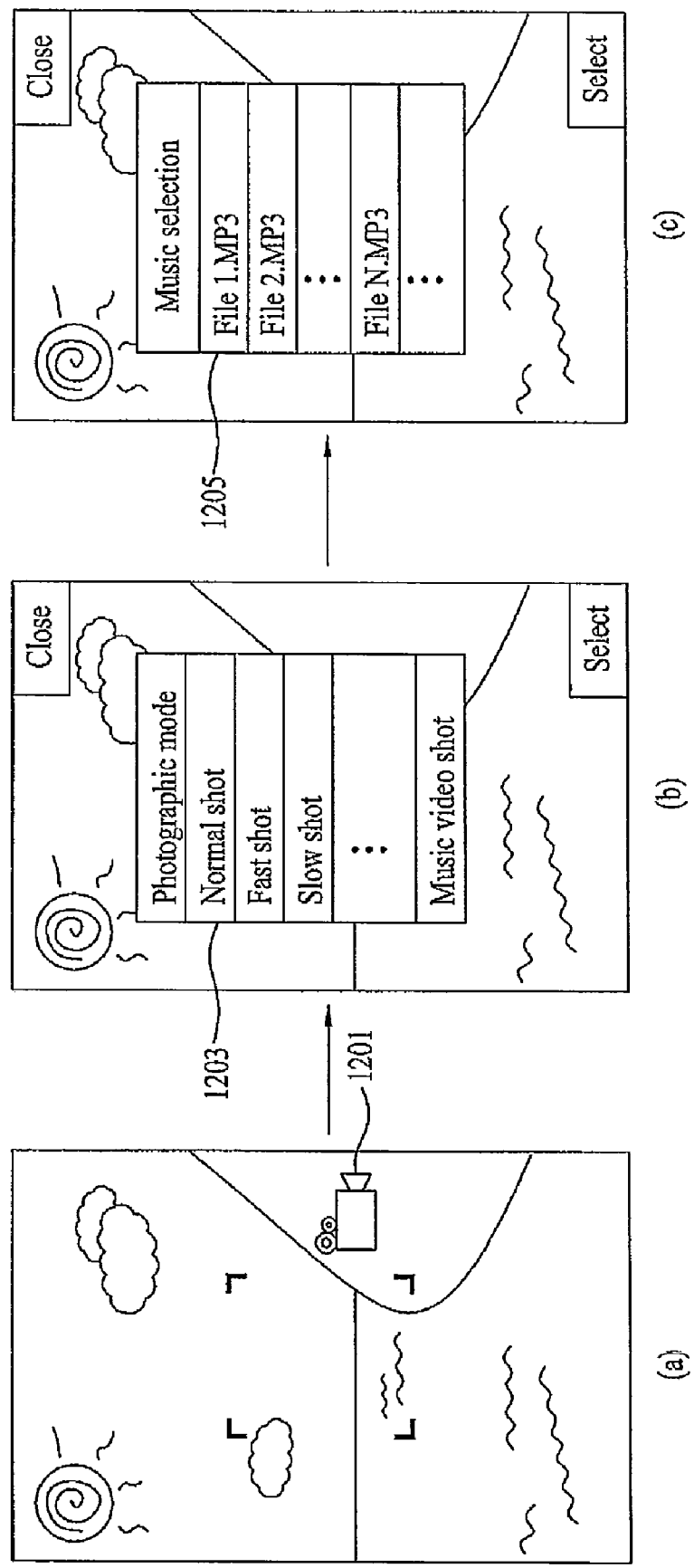

FIG. 12 is a state diagram for a method of selecting a specific music in a camera preview mode for music video generation.

FIG. 12(a) shows an image of a subject for photography that is displayed on a video shooting preview screen. An icon for guiding an image capture focus area is displayed on the preview screen. And, an icon 1201 for initiating and suspending video shooting can be displayed on the preview screen as well. Additionally, the controller 180 is able to perform a zoom function in the preview mode. Icon 1201 may be a touch-type icon and/or a haptic icon.

FIG. 12(b) shows a popup window 1203 for selecting a photographic mode is displayed. Popup window 1203 displays one or more selectable a photographic modes for capturing a moving picture. With popup window 1203, a user is able to select 'music video shooting' or a similar selection. If the 'music video shooting' is selected, the controller 180 displays popup window 1205 for selecting a music to be used for the 'music video shooting' [FIG. 12(c)].

When the display screen includes a touchscreen, a specific photographic mode selection from the popup window 1203 can be performed by a real-touch or a proximity-touch. A user is able to select the music to play. When a plurality of music files are selected, the controller 180 is able to sequentially play a plurality of the selected music files. The sequence may be user selectable or may be preset.

Figure 13:
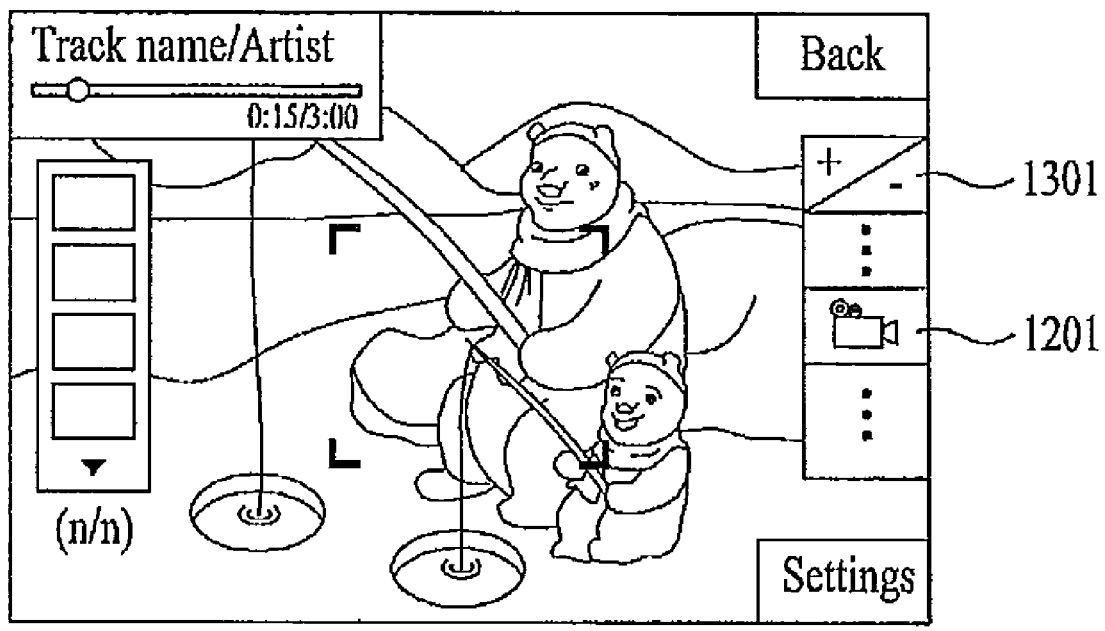

FIG. 13 is a diagram for a preview state in a music video shooting mode.

Referring to FIG. 13, a title and artist of music to be played can be displayed on a right top of a screen. Also, an album name or other metadata may be displayed. A total play time and a current play time of the music can be displayed. An icon for guiding a video focus area may displayed on the screen. And, a menu of executable functions may be displayed on the display (e.g., on a right part of the screen). The menu of executable functions may include an icon 1301 for adjusting brightness, an icon 1201 for capturing a moving picture and the like. When one of the displayed icons is selected, a menu corresponding to the selected icon is displayed and/or a corresponding function is executed. The menu of icons may be toggled on and off by the user.

When the screen includes a touchscreen, the icon selection can be performed by a real-touch or a proximity-touch. For instance, if the icon 1201 for capturing a moving picture is selected, a moving picture capture is initiated. In particular, if the icon 1201 is touched or proximity-touched, the controller 180 initiates a moving picture capture of a subject which is being displayed on a preview screen.

A thumbnail can be displayed on the display (e.g., on a left part of the screen). When a moving picture is captured as a plurality of videos, the controller 180 is able to determine the number of currently captured videos and populate the thumbnail section accordingly. Also, the controller 180 is able to display the number of the display image relative to the total number of videos in the sequence or in the memory or a total number of videos that possibly could be stored (e.g., the displayed "n/n"). The display n/n may indicate that a highlighted thumbnail represents the $3^{rd}$ of a sequence of 5 videos, or that a highlighted thumbnail represents the $3^{rd}$ of a total of 234 stored videos. The display n/n may also indicate that the highlighted thumbnail represents the $3^{rd}$ of a sequence of 500 possible stored images. If there is no captured video in memory, no picture is displayed on the thumbnail region. The thumbnail region may be toggled on and off by the user.

Figure 14:
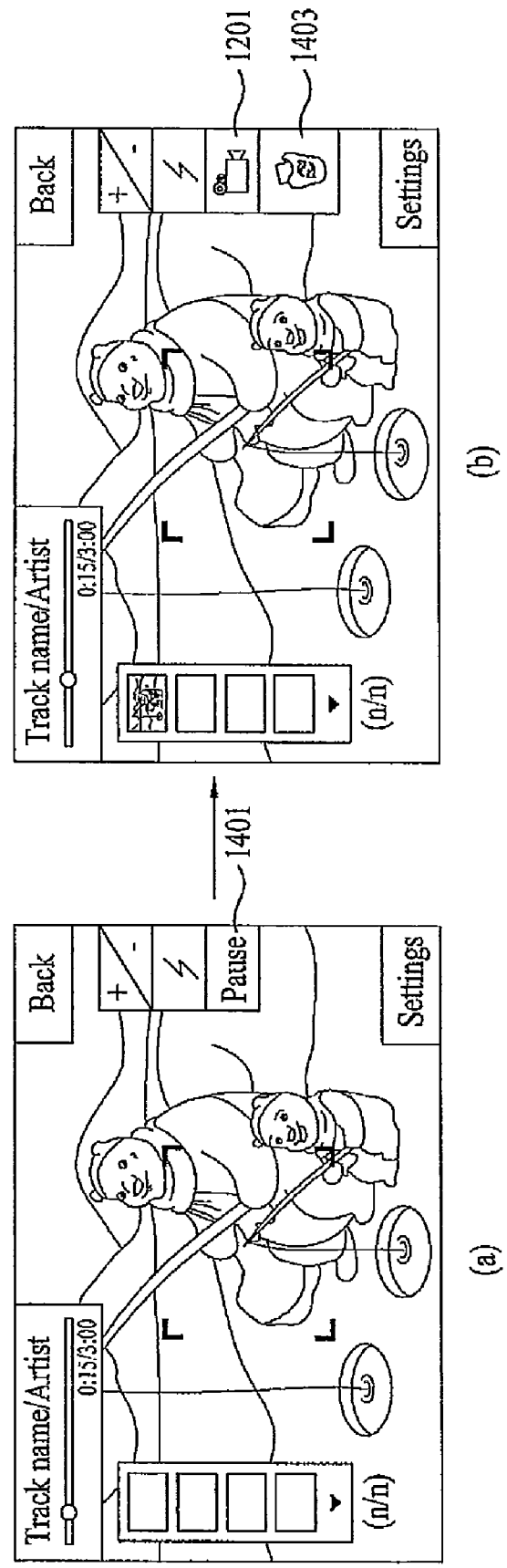

FIG. 14 is a state diagram for capturing a moving picture in a music video shooting mode.

FIG. 14(a) shows a case where a first moving picture is captured in the course of music playback. In this case, a 'Pause' icon may be displayed on the right part of the display screen. If 'Pause' is selected, the capture of the first moving picture is considered by controller 180 to be completed.

The moving picture captured before the 'Pause' is stored and is displayed as a thumbnail (e.g., on a left part of a screen [FIG. 14(b)]). If a moving picture is captured and displayed as a thumbnail, an icon 1403 for erasing the captured moving picture can be displayed (e.g., on a right part of the screen).

After the first moving picture capture is completed, a user is able to capture another moving picture. For instance, if an icon 1201 for capturing a moving picture is selected or if a signal for capturing a picture is inputted, the controller 180 is able to initiate a second moving picture capture.

Meanwhile, the total number of pictures, which can be captured, may be a default value or can be set by a user.

In addition to pausing the capture of the moving picture, the music played in the music video shooting mode may also be temporarily stopped (paused). This feature allows a user to change location while creating the music video. This feature also allows a user to accurately match a specific moving picture to a specific section of the played music.

The mobile terminal 100 according to one embodiment of the present invention is able to create a music video file using the music played in the music video shooting mode and the captured moving picture. In this case, the captured moving picture can be combined with the music such that a specific play section of the music matches the section in which the corresponding moving picture has been captured.

Figure 15:
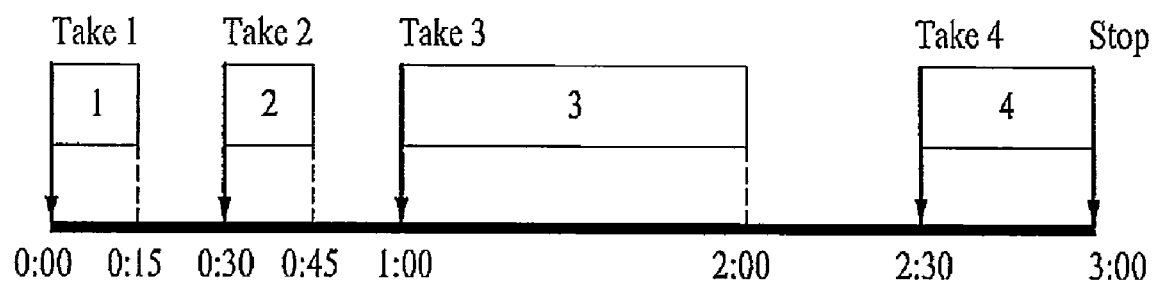

FIG. 15 illustrates an exemplary timeline relation between moving picture capture and a play section of music.

Referring to FIG. 15, a first moving picture starts to be captured at or near a time when the music starts to be played (e.g., time 0:00). The corresponding capture is then completed at a playtime of 0:15 seconds. A second moving picture starts to be captured at a playtime of 0:30 seconds. The corresponding capture is then completed at a playtime of 0:45 seconds. A third moving picture starts to be captured at a playtime of 1:00 minute. The corresponding capture is then completed at a playtime of 2:00 minutes. A fourth moving picture starts to be captured at a playtime of 2 minutes and 30 seconds (2:30). The corresponding capture is then completed at a playtime of 3:00 minutes. In this case, the controller 180 creates a music video file by combining the captured picture with the music such that a play section of the music matches the section of capturing the moving picture.

When the music video file created by the above method is played back, controller 180 displays the moving picture captured for the music play section (e.g., play start 0:00~playtime 0:15 seconds, playtime 0:30 seconds~playtime 0:45 seconds, playtime 1:00 minute~playtime 2:00 minutes, playtime 2 minutes and 30 seconds (2:30)~playtime 3:00 minutes).

The mobile terminal 100 according to one embodiment of the present invention is also able to create a music video file by a preprocessing or post-processing method. Details of the preprocessing and the post processing are explained in the foregoing description relative to still image processing, and will be omitted in the following description.

Differences between a method of inserting a moving picture in a music video file and a method of inserting a still picture will be explained in the following description.

The present invention is able to generate a music video by combining a moving picture captured in the course of music playback by real time by the preprocessing method.

The controller 180 is able to insert a specific picture between a play end timing point of a first moving picture and a play start timing point of a second moving picture. For instance, a specific moving picture can be inserted between a play end timing point of a first moving picture and a play start timing point of a second moving picture.

A specific still picture can be inserted between a play end timing point of a first moving picture and a play start timing point of a second moving picture with a prescribed time interval. For instance, controller 180 is able to insert a last frame of the first moving picture. Alternatively, controller 180 is able to insert a last I-fame of the first moving picture with a prescribed time interval.

In this case, the frame means each scene gathering to display a moving picture. Frames constructing a moving picture can include I-frame, P-frame, B-frame, etc. The I-frame (intra-frame) means an image obtained from independent coding within the corresponding image regardless of a forward or backward image. The P-frame (predictive-frame) means an image obtained from forward predictive coding. Namely, a coding process is performed using the I- or P-frame as a predictive picture for inter-frame prediction. And, the B-frame (bidirectional-frame) means the image obtained by predictive coding from both future and pas directions. In this case, since a corresponding I-frame is needed to encode or decode the P- or B-frame, a last I-frame of the first moving picture can be inserted with a prescribed time interval.

The controller 180 is able to generate a music video including a moving picture captured after completion of music playback and the playback music. A moving picture captured in the course of music playback is temporarily stored. The controller 180 is able to create a music video file by transcoding of a video signal of the temporarily stored moving picture and an audio signal of a playback music file.

Additionally, previously discussed FIG. 10 and FIG. 11 are also applicable to the case of inserting the moving picture in the above-described manner. This is explained in the foregoing description relative to still image processing and will be omitted in the following description.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a camera configured to capture a picture;
    an audio output module configures to output music;
    a display unit configured to display the captured picture;
    a controller operatively connected to the camera, the audio output module and the display unit, the controller configured to control the camera to capture a plurality of pictures while playing the music, the controller further configured to compose a video file while playing the music by combining the plurality of captured pictures with the played music such that specific playtimes of the music match respective capture timing points of the plurality of captured pictures; and
    a memory operatively connected to the controller and configured to store the composed video file.

2. The mobile terminal of claim 1, wherein the music playback is performed in a camera photographic mode.

3. The mobile terminal of claim 2, wherein when one of the plurality of pictures is captured while playing the music, the controller is configured to display on a prescribed area of a screen an identification mark representing the captured one of the plurality of pictures.

4. The mobile terminal of claim 3, wherein the identification mark includes a thumbnail.

5. The mobile terminal of claim 1, wherein the controller is configured to transcode a video signal of the video file and an audio signal of the played music.

6. The mobile terminal of claim 1, wherein when the music playback is completed, the controller is configured to automatically display a popup window for selecting whether to create a music video from the video file and the music.

7. The mobile terminal of claim 1, wherein the controller is configured to
    sequentially display the one captured picture and another captured picture, and
    insert a third captured image having a prescribed time interval between the one captured picture and another captured picture to compose a new sequence of captured pictures.

8. The mobile terminal of claim 7, wherein the controller is configured to transcode a video signal of the new sequence of captured pictures and an audio signal of the played music.

9. The mobile terminal of claim 7, wherein when the music playback is completed, the controller is configured to automatically display a popup window for selecting whether to create a music video from the new sequence and the music.

10. The mobile terminal of claim 1, wherein the controller is configured to pause the music playback.

11. The mobile terminal of claim 7, wherein the controller is configured to compose the new sequence during the music playback and the controller is configured to create a music video from the new sequence and the music upon completion of the music playback.

12. The mobile terminal of claim 11, wherein the controller is configured to compose the new sequence in real time and during the music playback.

13. The mobile terminal of claim 12, wherein
when the one captured picture is a still picture, the controller is configured to insert the third captured picture between a capture timing point of the one captured picture and a capture start timing point of the another captured picture, and
when the one captured picture is a moving picture, the controller is configured to insert the third captured picture between a capture complete timing point of the one captured picture and a capture start timing point of the another captured picture at a prescribed time interval.

14. The mobile terminal of claim 13, wherein the controller is configured to pause a playback of the music.

15. A method of generating a content in a mobile terminal having a camera, comprising:
playing, by the mobile terminal, music from a music file;
capturing, by the mobile terminal, a plurality of pictures while playing the music;
composing, by the mobile terminal, a video file while playing the music by combining the plurality of captured pictures with the played music such that specific playtimes of the music match respective capture timing points of the plurality of captured pictures; and
storing, by the mobile terminal, the composed video file.

16. The method of claim 15, wherein the step of playing music is performed in a camera photographic mode.

17. The method of claim 16, further comprising:
displaying on a prescribed area of a screen an identification mark representing one of the plurality of pictures when the one of the plurality of pictures is captured while playing the music.

18. The method of claim 17, wherein the identification mark includes a thumbnail.

19. The method of claim 15, further comprising:
transcoding a video signal of the video file and an audio signal of the played music.

20. The method of claim 15, further comprising:
automatically displaying, when the music playback is completed, a popup window for selecting whether to create a music video from the video file and the music.

21. The method of claim 15, further comprising:
sequentially displaying the one captured picture and another captured picture, and
composing a new sequence of captured pictures by inserting a third captured image having a prescribed time interval between the one captured picture and another captured picture.

22. The method of claim 21, further comprising:
transcoding a video signal of the new sequence of captured pictures and an audio signal of the played music.

23. The method of claim 21, further comprising:
automatically displaying a popup window for selecting whether to create a music video from the new composed new sequence and the music when the step of playing music from a music file is completed.

24. The method of claim 15, further comprising:
pausing the music playback.

25. The method of claim 21, further comprising:
composing the new sequence during the music playback; and
creating a music video from the new sequence and the music upon completion of the music playback.

26. The method of claim 25, the step of creating a music video comprising:
creating the music video in real time and during the music playback.

27. The method of claim 26, further comprising:
inserting the third captured picture between a capture timing point of the one captured picture and a capture start timing point of the another captured picture when the one captured picture is a still picture; and
inserting the third captured picture between a capture complete timing point of the one captured picture and a capture start timing point of the another captured picture at a prescribed time interval when the one captured picture is a moving picture.

28. The method of claim 27, further comprising:
pausing a playback of the music.

* * * * *